United States Patent Office 2,700,815
Patented Feb. 1, 1955

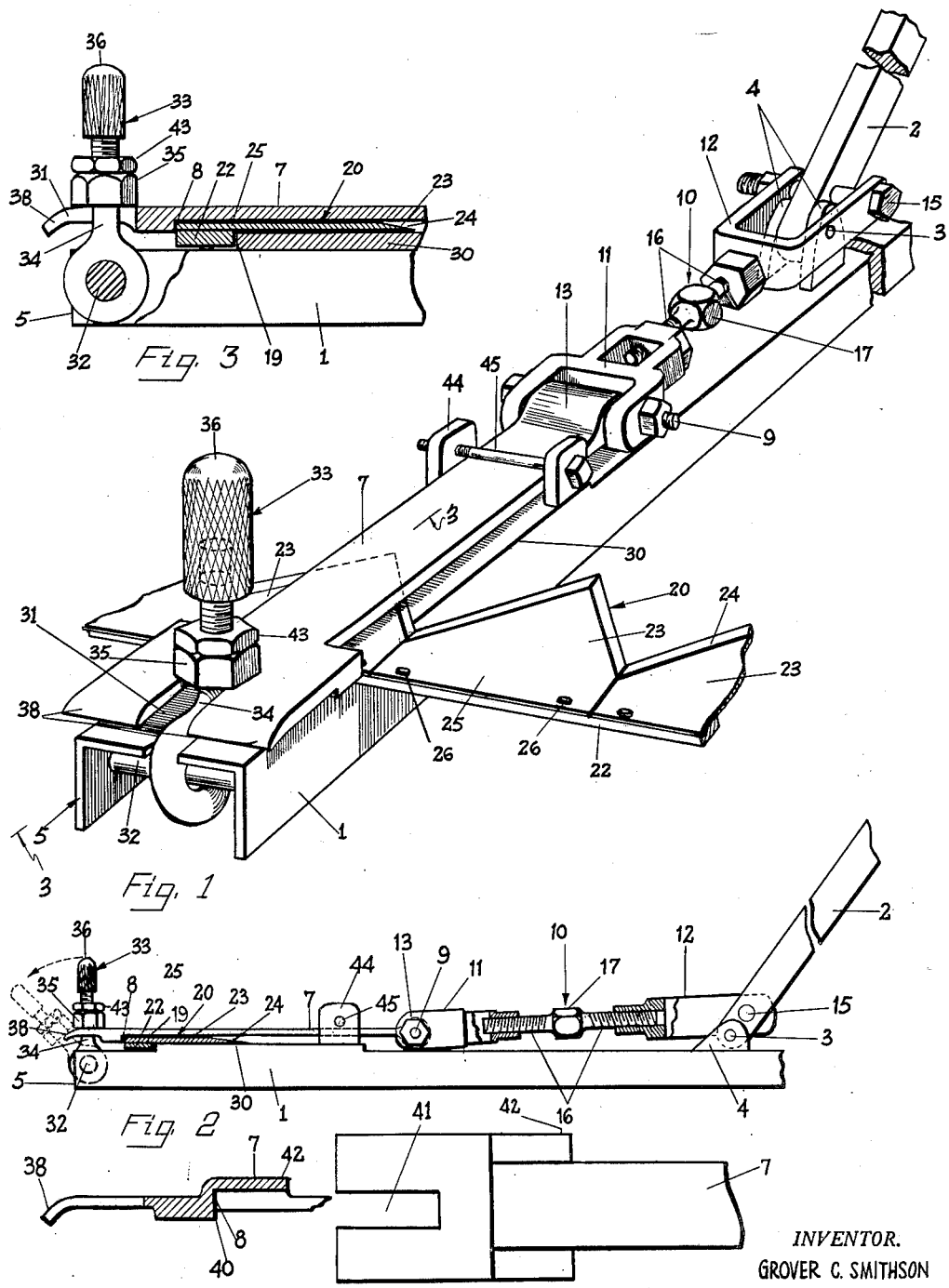
Feb. 1, 1955 — G. C. SMITHSON — 2,700,815
SECTION PULLER FOR MOWER KNIVES
Filed Feb. 12, 1951
INVENTOR.
GROVER C. SMITHSON
BY
Boyken, Mohler & Beckley
attorneys

2,700,815

SECTION PULLER FOR MOWER KNIVES

Grover C. Smithson, Corning, Calif.

Application February 12, 1951, Serial No. 210,545

2 Claims. (Cl. 29—267)

This invention relates to a section puller for a mower or harvester knife.

The cutter bar in a mower or harvester includes a knife that is made up of a row of coplanar, adjoining, knife sections of the same shape and size, each section being generally triangular with two adjacent edges being sharpened to their juncture which defines the point of the section. The marginal portion of each section along the remaining edge may be called the back of the section, and this is riveted to a straight bar that may be called the section bar. The said backs are in longitudinal alignment along the section bar and the points of the knives are also in alignment at one side of the section bar. The edges of the sections along their backs may be even with one of the longitudinally extending edges of the section bar or they may extend slightly beyond the latter edge.

The above knife, in a mower or harvester, is connected at one end with a pitman for reciprocation of the knife longitudinally of the row of knife sections, said knife being part of the cutter bar which cutter bar usually includes end shoes, guards for the cutting units, ledger plates, wearing plates, etc.

A frequent occurrence preparatory for and during the mowing or harvesting season is the replacing of one, several or all of the above described knife sections on the section bar. The bar and sections are of high grade steel, and the swaged or peened ends of the rivets project prominently from the knife sections. Each section is held by two rivets.

The customary method of removing each section is to remove the knife (section bar and sections) from the cutter bar as a unit and to then secure the knife in a vise, if one is available. The operator then takes a cold chisel and a hammer and proceeds to cut off the rivet heads with the chisel, releasing the section or sections that are to be replaced. If no vise is available, as frequently occurs in the field when one or more sections are broken, the operator merely provides as secure a support for the knife as is possible, and cuts off the ends of the rivets with the cold chisel, or attempts to do so.

In either of the above procedures, many physical injuries occur each year. There is imminent danger to the eyes and hands from the ends of the rivets that fly off with considerable force when they are severed. The fingers and hands of the operators are frequently injured by being struck by the hammer, and many times the fingers and hands are cut by the sections, due to unexpected slippage of the chisel or unexpected movement of the knife, or sudden and unexpected severance of the rivet. Such injuries are sometimes very costly in many ways and usually seriously impair the efficiency of the operator for a period of time.

Another objection to the heretofore method of "pulling sections" from the section bar, which is the expression used for removing said sections, is the frequent distortion of the section bar, whether it is held in a vise or not, although most distortions occur in the field where there is no vise. The distortion of the section bar may entirely incapacitate a mower or harvester, and at the best, it greatly impairs its cutting efficiency since the knife sections will not be coplanar if the section bar is bent or distorted. They must be coplanar to properly fit against the ledger plates with which they cooperate to cut the crop that is being harvested.

An additional objection to the heretofore and above described methods of pulling the knife sections is the length of time required. An expert workman will require from two to three hours to remove the sections from a standard five foot knife. Inasmuch as such removal may occur a number of times during the year, it is obvious that it is an expensive procedure, and this, coupled with the ever present likelihood of injury to the operator and to the section bar, may make the cost run into hundreds and even thousands of dollars when such injuries occur. At the best, where no injury occurs, the time required for removing the sections is a substantial expense that heretofore has been deemed necessary, and where breakages of knives occur in the field, the time consumed before a single section is replaced may run into hours, during which time the mower or harvester is idle.

With the present invention, an operator can easily remove all sections of a knife in from ten to twenty minutes time. A single section may be removed in a matter of seconds, and such removal is accomplished with perfect safety to the operator and to the section bar.

The principal object of the present invention is the provision of strong, economical and simple means for quickly, easily, and safely removing knife sections from the section bar of a mowing machine or harvester.

Other objects and advantages will appear in the description and in the drawings.

In the drawings, Fig. 1 is a perspective view of the section puller showing a portion of a knife in position for removal of a section from the section bar.

Fig. 2 is a side elevational view of the device.

Fig. 3 is an enlarged, vertical sectional view of the forward end of the puller taken along line 3—3 of Fig. 1.

Fig. 4 is a fragmentary plan view of a portion of the device.

Fig. 5 is a side elevational view of the portion shown in Fig. 4.

In detail, the section puller illustrated in the drawings comprises a base 1 that may be a length of an inverted channel member for lightness and strength or it may be merely an elongated casting.

An operating handle 2 extends slantingly upwardly from the upper side of said base and over said base and is disposed in the same vertical plane with the latter. The lower end of said handle is pivotally secured to said base by means of a horizontal pivot 3 (Fig. 2) that extends transversely of the base between a pair of opposed ears 4. Said ears are integral with the base.

The ears 4 and pivot 3 are at a point about midway between the ends of the base 1. The forward end of said base is indicated generally by the numeral 5 (Fig. 1) and the opposite end will be called the rear end. The terms "forward" or "forwardly" as used hereafter are used with reference to the forward end of the device, which is the same as the forward end of the base, and similarly, the terms "rear," "rearwardly" are used with reference to the rear end of the device or base.

The handle 2, when in a position preparatory to pulling or removing a knife section extends slantingly rearwardly and upwardly from pivot 3, and is movable about said pivot from its said upwardly inclined or slanted position in a downward direction toward the base, and vice versa.

Disposed over the forward end of the base 1 forwardly of pivot 3, is a metal strip generally designated 7. This strip is the puller element, in that it engages the section to be pulled off the section bar and pulls it off, shearing the rivets at a point between the section and bar in this movement. Also this strip functions as a hold-down member for holding the knife down during pulling of the section.

The strip 7 is formed on its underside at a point adjacent to its forward end with a rearwardly facing square shoulder 8 (Fig. 2) and at its rear end it is connected by a horizontal pivot 9 with the forward end of a link that is generally designated 10.

The link 10 comprises yokes 11, 12 respectively at the forward and rear ends thereof. The rear end of strip 7 extends between and is secured to the forwardly directed ends of the arms of yoke 11, said rear end of the strip being formed to provide an eye portion 13 through which the pivot 9 extends. The ends of said pivot extend through coaxial apertures in the ends of the arms of yoke 11.

The arms of yoke 12 at the rear end of the link 10 receive the handle 2 therebetween at a point spaced a relatively short distance from pivot 3 toward the outer end of handle 2. The arms of yoke 12 are formed with coaxial apertures in their ends, and which apertures are adapted to register with an opening formed in handle 2 for a pivot 15 that pivotally connects the handle with the said arms, or with the rear end of link 10.

The yokes 11, 12 are connected by a double ended, screw 16 the central portion 17 of which is polysided for engagement with a wrench for turning said screw. The ends of the screw are reversely threaded relatively to each other and are respectively in threaded engagement with the internal threads in openings that are respectively formed in yokes 11, 12. Thus screw 16 forms the central portion of link 10, and upon rotating the screw 16 in one direction the distance between pivots 9, 15 will be increased, and upon rotating the screws 16 in an opposite direction the said distance will be shortened.

The forward end portion of the base 1 is formed on its upper side with a forwardly directed square shoulder surface 19.

The knife that carries the sections to be removed is generally designated 20 (Fig. 1).

This knife comprises a section bar 22, that may be from about three quarters of an inch to about an inch in width, and about one quarter of an inch thick, slightly more or less.

The knife sections 23 each have convergently extending adjacent cutting edges 24 that usually come to a point, and the marginal portion 25 of each blade extends between the divergent ends of edges 24. This portion 25 is normally at least equal to the width of the bar 22.

The portions 25 of the sections 23 are secured against one side of said bar 22 in adjoining relationship and in longitudinal alignment with the sections coplanar. A pair of rivets 26 extending through each of said portions 25 adjacent opposite ends thereof and through the bar 22 to secure the sections to the bar 22.

The swaged ends of the rivets are the uppermost ends, as seen in Fig. 1 and very noticeably project above the knives.

The free edges of the knives along portions 25 may be about even with the edge of the bar 26 that is adjacent thereto, or said edges may project slightly therefrom, according to the make of harvester or mower, but usually said edges are even with the adjacent edge of the bar.

The vertical depth of the shoulder 8 is about equal to the thickness of each knife 23, and the vertical depth of the shoulders 19 is about equal to the thickness of the bar 22. The faces of the shoulders 8, 19 face generally toward each other and are spaced apart a distance that is slightly greater than the width of the bar 22 when the handle 2 is swung upwardly to a position spacing shoulders 8, 19 sufficient to receive the section bar between them.

By the above arrangement, it will be seen that the bar 22 may be positioned on the base 1 extending transversely thereacross, and against the shoulder 19. When in such position with the knife 23 uppermost and overlying base 1 and over the portion 30 of the base 1 that extends rearwardly from shoulder 19, the shoulder 8 on strip 7 will extend across the rear edge of the knife 23 that extends along the portion 25 of the latter.

The forward end of the strip 7 is formed with a forwardly opening slot 31, and extending between the sides of the base 1 at its forward end is a horizontal pivot 32 that pivotally carries the lower end of hold-down device 33. This device includes a straight shank 34 at its lower end that is adapted to swing upwardly and rearwardly into slot 31 from a position clear of the slot. An enlarged portion 35 on said shank, which may be a nut adjustable along the shank is adapted to swing with the handle 2 to a position overlying the forward end of the strip 7 for holding the strip down against a knife 23 when the latter is in position between the strip 7 and base 1.

An extension 36 on the shank 34 and above the nut 35 provides a handle for manually swinging the device 33 to and from the position holding the strip down. It may also be noted that the forward ends 38 of the strip 7, at opposite sides of slot 31, are formed to provide downwardly curved surfaces that are adapted to engage the underside of nut 35 to insure a tight securement of the strip 7 against the knife when the latter is in position for removing a section 23.

The length of the shoulder 8 is substantially equal to the length of the marginal portion 25 of each knife section, and as the swaged ends of the rivets 26 project above each section, the strip is of reduced width rearwardly of the said shoulder 8 so as to extend between the rivets 26 of each section.

In operation the handle 2 is swung up to move the strip 7 forwardly a sufficient distance for positioning the knife 20 across the base with the shoulders 8, 19 respectively against the square rear edge of a section 23 and the forward edge of section bar 22.

The forward end of the strip 7 is adapted to be raised enough to slip the knife to the position above noted when the handle 36 is swung forwardly to a generally horizontally extending position. The knife is then positioned as above described with respect to the shoulders 8, 19 and with the strip 7 extending between a pair of the rivets 26 that secure one section to the section bar 22. The handle 36 is then swung upwardly so that the enlarged member 35 tightly holds the strip against the knife 20.

After the above steps are taken, the handle 2 is forced down, with the result that the section 23 that is engaged by shoulder 8 will move rearwardly on base 1 relative to the section bar 22, and the rivets 26 will be clearly sheared off by the said section.

The knife can then be moved longitudinally across the base 1 for successively removing the sections.

In Figs. 4, 5 is shown a slightly modified form of the hold-down strip at its forward end in which shoulder 40 is the same as shoulder 8 and the forward end of the strip is slotted at 41 for the hold-down device of Figs. 1 to 3. However, rearwardly of shoulder 40 and at its opposite ends are cover portions 42 that are adapted to extend over the rivets 26 that are to be sheared off. These covers merely function to prevent the upper portions of the sheared rivets from flying upwardly, and striking the operator. This seldom happens, but is possible, and as no injury could occur to the operator except from possible upwardly flying rivet ends, the covers will prevent this.

It is obvious that the longitudinal movement of strip 7 need be only a distance substantially equal to the diameter of a rivet 26 (preferably slightly more) to effect a shearing of the rivets. The distance between pivots 3 and 15 may therefore be quite small. About an inch is adequate. Thus a handle 2 of only about two feet in length operating at its outer end through an arc of only about fifteen inches can be very easily operated by any person for shearing off the rivets.

The adjustment provided for by the screw 16 enables the section puller to be operated on any of the several types of knives. In some the section bar 22 is slightly wider than in others, and as already explained, the marginal portion 25 may, in some instances extend past the adjacent edge of the section bar. In any event, by rotating screw 16 in one direction or the other the puller is readily adapted to any variation.

Variations in the thickness of the section bar can be compensated for by adjusting nut 35, and a lock nut 43 as shown will lock the nut 35 in any adjusted position.

The base 1 is preferably provided with a pair of spaced upstanding ears 44 forwardly of the link 10 and at opposite sides of the strip 7. A hold-down bolt or bar 45 may be secured to said ears in a position extending over the strip 7.

There is sufficient clearance between the bar 45 and the strip to permit the outer end of the latter to be elevated sufficiently for inserting the knife 20 between the base 1 and strip 7, and for withdrawing said knife. However, bar 45 will prevent the strip from swinging upwardly to any substantial degree during a section removing operation.

From the above description, it will be evident that, fundamentally, this invention provides a pair of members supported for reciprocable movement relatively in parallel, closely adjacent planes, the strip 7 being one of such members and base 1 being the other. These members are formed with generally opposedly directed shoulders 8, 19 at opposite sides of a plane that is parallel with and intermediate said adjacent planes. Said shoulders are on the adjacent sides of said mmbers and are spaced apart a sufficient distance to respectively engage one of the longitudinally extending edges of said section bar and the back edge of a knife section riveted on said bar, which latter edge is adjacent to the longitudinal edge of said section bar that is opposite said one longitudinally extending edge so that relative movement of said members for moving said shoulders toward each other will cause the knife section on a section bar that is between said shoulder to be removed from said section bar. Handle 2 provides means for causing said movement of said members relatively, and the hold-down device at the forward end of the base and strip 7 provides the means for holding the two members against separation during said movement.

Usually the hold-down device will be automatically released from holding the strip 7 down after the rivets 26 have been sheared off and at the very end of the downward stroke of the handle 2.

I claim:

1. A section puller for removing knife sections from the section bar of a cutter bar comprising: a horizontally disposed base member provided with a laterally facing shoulder adapted to engage one lateral edge of such section bar with a knife section on said bar extending horizontally over said shoulder and with the back edge of such knife section adjacent the other lateral edge of said section bar that is opposite said one lateral edge, an elongated knife engaging member over said base and adapted to extend over and past such knife section when the section bar carrying such knife section is against said laterally facing shoulder, said knife engaging member being formed at one end with a laterally directed shoulder positioned to engage said back edge of such knife section, means for moving said knife engaging member over said base in a direction for movement of the said laterally directed shoulder on said member generally toward the shoulder on said base for moving the knife section engaged by said member off said section bar, said knife engaging member being pivotally supported on said base at its opposite end for swinging of the said member upwardly and away from said base to permit insertion of a knife section and section bar between said member and said base, and a fastening device swingably secured to said base and adapted to slidably engage the side of said member opposite said shoulder for releasably holding said member against separation from said base, during said movement, means for adjustably changing the effective length of said fastening device to accommodate section bars of different thicknesses.

2. A section puller for removing knife sections from the section bar of a cutter bar comprising: an elongated horizontally extending base provided on its upper surface with an upwardly offset portion providing a laterally directed first shoulder facing longitudinally of said base toward one end of the latter adapted to engage said section bar with a knife thereon extending over said portion when such bar is positioned transversely across said base, an elongated strip over said base and extending longitudinally thereof having a downwardly offset portion providing a laterally directed second shoulder adapted to engage the back edge of the knife section on such section bar when the latter is in the aforesaid engagement with said first shoulder, said second shoulder being spaced between said front shoulder and said one end about the width of such section bar, a vertically extending clamping member at said one end of said base and swingably secured at its lower end to said base and engageable at its upper end with the upper side of said strip for releasably holding said strip to said base, an upwardly extending handle pivotally secured at its lower end to said base, a link pivotally connected at its ends with said handle and with the end of said strip remote from said one end of said base for movement of said second shoulder generally toward said first shoulder upon swinging said handle downwardly for thereby separating said knife section off said section bar, said means being movable out of engagement with said strip to permit swinging the latter away from said base whereby a section bar may be positioned between said base and said strip.

References Cited in the file of this patent

UNITED STATES PATENTS

| | | |
|---|---|---|
| 1,051,356 | Thomas | Jan. 21, 1913 |
| 1,249,167 | Milligan | Dec. 4, 1917 |
| 1,864,405 | Brewer | June 21, 1932 |
| 1,896,009 | Ottesen | Jan. 31, 1933 |
| 2,146,629 | Jauch et al. | Feb. 7, 1939 |
| 2,391,405 | Fuglie | Dec. 25, 1945 |
| 2,470,262 | Poyzer | May 17, 1949 |

FOREIGN PATENTS

| | | |
|---|---|---|
| 22,798 | Great Britain | of 1905 |
| 472,379 | Great Britain | Sept. 22, 1937 |